US006182080B1

United States Patent
Clements (10) Patent No.: US 6,182,080 B1
(45) Date of Patent: *Jan. 30, 2001

(54) SYSTEM, METHOD AND COMPUTER PROGRAM PRODUCT FOR STORAGE OF A PLURALITY OF DOCUMENTS WITHIN A SINGLE FILE

(75) Inventor: Bradley H. Clements, Pleasant Grove, UT (US)

(73) Assignee: Netvoyage Corporation, South Orem, UT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/929,442

(22) Filed: Sep. 12, 1997

(51) Int. Cl.[7] ................................................. G06F 17/30
(52) U.S. Cl. .......................... 707/102; 707/100; 707/200; 707/202
(58) Field of Search .................................. 707/203, 204, 707/201, 202, 102, 200, 100

(56) References Cited

U.S. PATENT DOCUMENTS

| D. 399,836 |   | 10/1998 | Wu et al. ........................ D14/114.2 |
|---|---|---|---|
| 5,432,928 | * | 7/1995 | Sherman ................................. 707/3 |
| 5,488,717 | * | 1/1996 | Gibson et al. . |
| 5,548,759 | * | 8/1996 | Lipe ..................................... 707/201 |
| 5,551,028 | * | 8/1996 | Voll et al. ............................ 707/103 |
| 5,588,147 |   | 12/1996 | Neeman et al. ..................... 395/601 |
| 5,749,080 | * | 5/1998 | Matsumoto et al. ................. 707/100 |
| 5,790,790 |   | 8/1998 | Smith et al. ..................... 395/200.36 |
| 5,832,508 | * | 11/1998 | Sherman et al. .................... 707/200 |
| 5,832,518 | * | 11/1998 | Mastors ............................... 707/202 |
| 5,832,526 | * | 11/1998 | Schuyler ............................. 707/205 |
| 5,870,757 | * | 2/1999 | Fuller ................................. 707/201 |
| 5,907,673 | * | 5/1999 | Hirayama et al. .................. 707/200 |
| 5,930,797 | * | 7/1999 | Hill .................................... 707/101 |

OTHER PUBLICATIONS

Brockschmidt K., *Inside Ole*, Second Edition, Ch. 16, Microsoft Press, pp. 761–808, 1995.

Terry et al., Managing Update Conflicts in Bayou, a Weakly Connected Replicated Storage System, *Proceedings 15th Symposium on Operating Systems Principles* (SOSP–15), pp. 172–183, Dec. 1995.

IBM Cryptolope Containers, IBM Info market, http://www.infomarket.ibm.com/ht3/crypto.htm pp. 1–3, Nov. 17, 1995.

Cryptolope Container Technology, http://www.cryptolope.ibm.com/white.htm, pp. 1–16, Mar. 21, 1997.

IBM Cryptolope Home, http://www.cryptolope.ibm.com/product.htm, pp. 1–7, Aug. 7, 1997.

(List continued on next page.)

* cited by examiner

Primary Examiner—Hosain T. Alam
Assistant Examiner—Jean M. Corrielus
(74) Attorney, Agent, or Firm—Workman, Nydegger & Seeley (57) ABSTRACT

The present invention provides systems and methods for storage of multiple documents and a tracking log within a single file. More specifically, the present invention provides a convenient way to organize multiple documents and store them within a single file in a manner that facilitates exchange of the collection of documents and collaboration on the collection by a group of individuals. The metaphor of an envelope is used to store multiple documents and other information. Envelopes may be copied and routed or transferred to a group of individuals. Routing or transfer of envelopes is accomplished via an email transport or other mechanisms. The tracking log tracks actions performed by entities on the envelope or on documents contained therein. Multiple copies of the envelopes may be synchronized using an email or other transport system.

22 Claims, 6 Drawing Sheets

OTHER PUBLICATIONS

The RealSpace Imaging Solution, realspace wpaper, pp. 1–6, 1997.

Microsoft Office 97 Binder web pages, Office 97–Workgroup Whitepaper, 1996.

Knowledge Base, Fast Tips: "Binder Questions and Answers", created Aug. 28, 1995 and revised Sep. 16, 1996.

Microsoft Office 97 Binder File Format, available on Internet by at least Aug. 26, 1997.

CI Labs, Open Doc: The New Shape of Software, 1994.

Ole documents: Technical Backgrounder, May 1994.

Chapter 5 of *ActiveX Ole*, by David Chappell, Published by Microsoft Press, 1996.

Chapter 7 of *Inside OLE*, by Kraig Brockschmidt, Published by Microsoft Press, 1995.

SYSTEM, METHOD AND COMPUTER PROGRAM PRODUCT FOR STORAGE OF A PLURALITY OF DOCUMENTS WITHIN A SINGLE FILE

BACKGROUND OF THE INVENTION

1. The Field of the Invention

This invention relates to the storage of documents. More specifically, the present invention allows the storage of multiple documents and other information within a single file.

2. The Prior State of the Art

Almost since the inception of the computer, users have interacted and performed useful work on a computer through specialized programs designed to perform various tasks. The specialized programs are often referred to as application programs. Application programs allow users to perform desired tasks such as word processing, spreadsheet creation, data entry, and so forth. Traditional interaction with application programs created a view for the user that was very application oriented. When a user wished to perform a certain task, the user would start execution of the desired application program and perform all interaction with the computer through the application program. For example, when a user wished to create a word processing document, the user would begin execution of the word processing program and create or edit the word processing document through the word processing program. Once a document had been created or edited, the document could be saved for later retrieval.

The process of interaction with the application program described above was, in large measure, dictated by the operating systems used in early computers. Many of these operating systems could accept only a limited number of commands. For example, early operating systems could identify and begin execution of an application program, but could not determine what to do with a file containing a document used by an application program. This situation thus required a user to first begin execution of an application program before opening or creating a document used by the application program. The result was that documents used by application programs took a very secondary role while application programs took a very visible role.

This situation began to change with the advent of operating systems that could associate a document with a particular application program. Such operating systems typically had a graphical user interface with documents and application programs depicted by icons. When a user "opened" a document, the operating system would begin execution of the appropriate application program and then load the document into the application program. With these new capabilities, documents could now assume a central role in the user's interaction with the computer. Application programs could thus be de-emphasized as simply a mechanism to perform various operations on a particular document. This view is it much closer to a user's perception of importance. From a user's point of view, the information contained in a document is the item of interest, not the application program.

Today, many users work with a wide range of applications, each providing particular capabilities or information necessary for a user. For example, for a given project a user may have multiple word processing documents, a spreadsheet, a database file, and several drawing files. This collection of documents may all relate to various aspects of the project and may all have relevance in certain contexts.

In today's business environment, the need to work collaboratively on a given project is steadily growing. Thus, there is a need for several individuals to work on groups and collections of documents and exchange information and work on the documents. At the same time, computing hardware has evolved to the point where many computers may be networked together through a Local Area Network (LAN) or other types of networks. Computer hardware thus supports widespread exchange of information. In addition, collections of documents may need to be routed among all members of a work group so that all may have input into the documents. Thus, two fundamental problems must be addressed. The first is the collection and organization of information and the second is the distribution of the collected information.

Traditional approaches to organizing and grouping such a collection of information have taken one of two approaches. The first approach collects and organizes information into a storage hierarchy that stores related information together. For example, a directory may be created on a disk and all information relating to a particular project may be stored and organized in that directory, and any associated subdirectories. Another approach utilizes document management programs to group various documents together and control access to those documents. In either case, the result is a group of documents that reside in a central repository and must be accessed in that repository and, in the case of the document management system, through a defined mechanism.

Both of the traditional approaches, to some extent, begin to take the focus off of the documents and the information contained therein. In addition, these approaches to organization may impose strict working rules or inhibit the free-flow collaboration of members of a work group. For example, if all documents are stored in a central directory, users must know the location of the documents. This requires using an application program or some other device to locate the desired documents. Also, there is little or no control over how various versions of the documents are managed. Finally, using such an approach creates great difficulties if copies of documents are to be routed among various members of a work group. If the individual documents are routed among the work group, whatever organization was imposed by the directory structure is lost.

Using a document management system has similar problems. Because access to the documents is controlled by the management system, there is no way to route documents among a work group and still have the controls of a document management system.

What is needed, therefore, is a mechanism that allows groups of individuals to exchange collections of documents and associated information in a manner that is as transparent as possible to the user. The exchange of information should work well in a LAN or other network environment. Furthermore, the paradigm used should be familiar to users so that users may easily adapt and incorporate the technology into their daily workflow.

SUMMARY AND OBJECTS OF THE INVENTION

The foregoing problems in the prior state of the art have been successfully overcome by the present invention, which is directed to a mechanism for storing and distributing a plurality of documents and other information in a single file. The present invention uses the convenient metaphor of an envelope to visually and intuitively represent the basic concept of the invention. The present invention provides a mechanism whereby multiple documents adapted for use with one or more application programs may be stored within a single file. Thus, documents associated with a single task or project may be grouped together and stored in a single container file, sometimes called a NetEnvelope (a trademark of Net Voyage Corporation) or simply an envelope. This envelope may then be sent to various members of a work group so that each may have access to the information contained in the collection of documents.

To facilitate transfer of information among various members of a work group, the present invention provides a mechanism whereby a container file may be routed to various members of the work group via email. The invention will take the routing information and store the information with the collection of documents in the envelope. Then an email message addressed to the first member of the routing list will be generated. Attached to the email message will be the container file containing the routing information and other documents. The email will be sent via an email transport. When the email reaches the first recipient, the first recipient may open it and read it. Because the routing information is stored within the envelope, it is easy to determine that the envelope is in the middle of a route. The user interface may be changed so that the user may continue to route after he is finished with the envelope. When the user indicates that the route should be continued, the first recipient from the routing list is discarded and a new email is generated to the next recipient on the list. The envelope is then attached to the email and the email is sent along to the next recipient on the list.

The present invention may store multiple documents in a single file using any number of technologies that support such a capability. For example, the present invention may use Microsoft's OLE compound file technology. This technology supports structured storage whereby a structure within a file may be created that is analogous to the hierarchical directory structure used on mass storage devices such as magnetic hard disk drives. Using this technology, a structure may be established that stores a plurality of documents within a single file. Other technologies supporting similar structured storage may also be utilized.

In addition to multiple documents, the present invention may also store other information in the envelope. For example, the present invention may store a tracking log that contains a history of actions performed by various entities on either the envelope or the individual documents. Such a tracking log is extremely useful for security purposes to identify what actions have been taken on the envelope or the associated documents and who performed those actions. For example, when a container file is created, an entry may be made in the tracking log indicating that the envelope was created, the entity that created the envelope, and various other associated information such as the time that the envelope was created, and the mechanism used to authenticate the identity of the entity that performed the operation.

When assessing the validity of a tracking log, it may be extremely important to determine how the identity stored in the tracking log has been authenticated. Such authentication information may allow a determination that the entity recorded in the tracking log is actually the entity that performed the operation. As an example, suppose the identity of a user was authenticated using a secure authentication method. An example might be a challenge and response sequence where the user has to supply a password that is known only to the user. If the authentication procedure is able to impart a high degree of confidence that the user is actually who he or she appears to be, then there is a high degree of confidence that the identified user actually performed the operation. If, on the other hand, the authentication procedure does not impart a high degree of confidence in the identity of the user, then the tracking log will reflect that lower degree of confidence and the tracking log may be evaluated in that light.

In summary, storing a tracking log with an envelope provides the ability to identify what actions have been performed on the envelope and/or the individual documents and other information stored therein. Such a tracking log may also be used for security auditing purposes to identify who performs specific actions on the envelope and/or the documents.

In addition to documents and a tracking log, the present invention may also store other information in the envelope. Such information may include various properties of the envelope and/or documents. Such properties may be used to identify and track various types of information that are necessary or desirable to perform various functions. For example, the version of the software that created the envelope may be stored as a property in the envelope. If future versions of the invention change the storage structure, then by reading the version number from a property stored in the envelope, the invention may know what format is used in the envelope and make adjustments accordingly. Properties associated with a particular document may include such information as the author of the document, a summary of the document; the version number of the document, and so forth.

Because an envelope implements structured storage whereby multiple documents may be stored therein, the invention may also implement storage structure to store multiple versions of a single document. For example, suppose an initial version of a document is created and stored in an envelope. Then, during editing, several other versions of the document are created. All versions of the document may be stored in the same envelope to provide a history of the changes made during the editing process. Rather than store complete versions, it may also be possible to store an initial version and the changes that were made to the initial version.

Since the documents stored in an envelope are designed to be used with a particular application program, the invention may provide an interface between the application program and the desired document. For example, suppose a user examines an envelope and decides to view or edit the contents of a particular document stored therein. According to the graphical user interface mechanisms commonly employed in personal computers, the user may indicate a desire to edit the document by double clicking on an icon representing the document in the envelope. The invention may then initiate execution of the proper application program and provide a pointer or other means for the application program to reference the appropriate document. In providing access to the appropriate document, the invention may provide a pointer into the envelope file itself or a document contained therein or, if desired, may extract the document from the envelope and provide the document to the appropriate application program. After the user is finished with the document, the invention may take steps to ensure that any changes made to the document are stored in the envelope. As previously mentioned, this may entail storing a new version of the document in the envelope or may be accomplished by storing the appropriate changes in the envelope.

In summary, the invention provides a convenient mechanism to gather related information together into a container file. This container file may then be operated on by various users. The container file may be transferred between users. When formation, such as a tracking log, may be kept with the container file to track the history of actions performed on the container file or the information contained therein. Accordingly, it is a primary object of this invention to provide a system and method for storing multiple documents within a single file. Other objects of the invention include: storing additional information in the file that allows tracking of actions performed on the file or on the documents contained in the file; providing a simple mechanism to allow a group of individuals to collectively work on a group of documents; and provide a mechanism that allows a collection of documents to be routed among a group of individuals.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will be more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
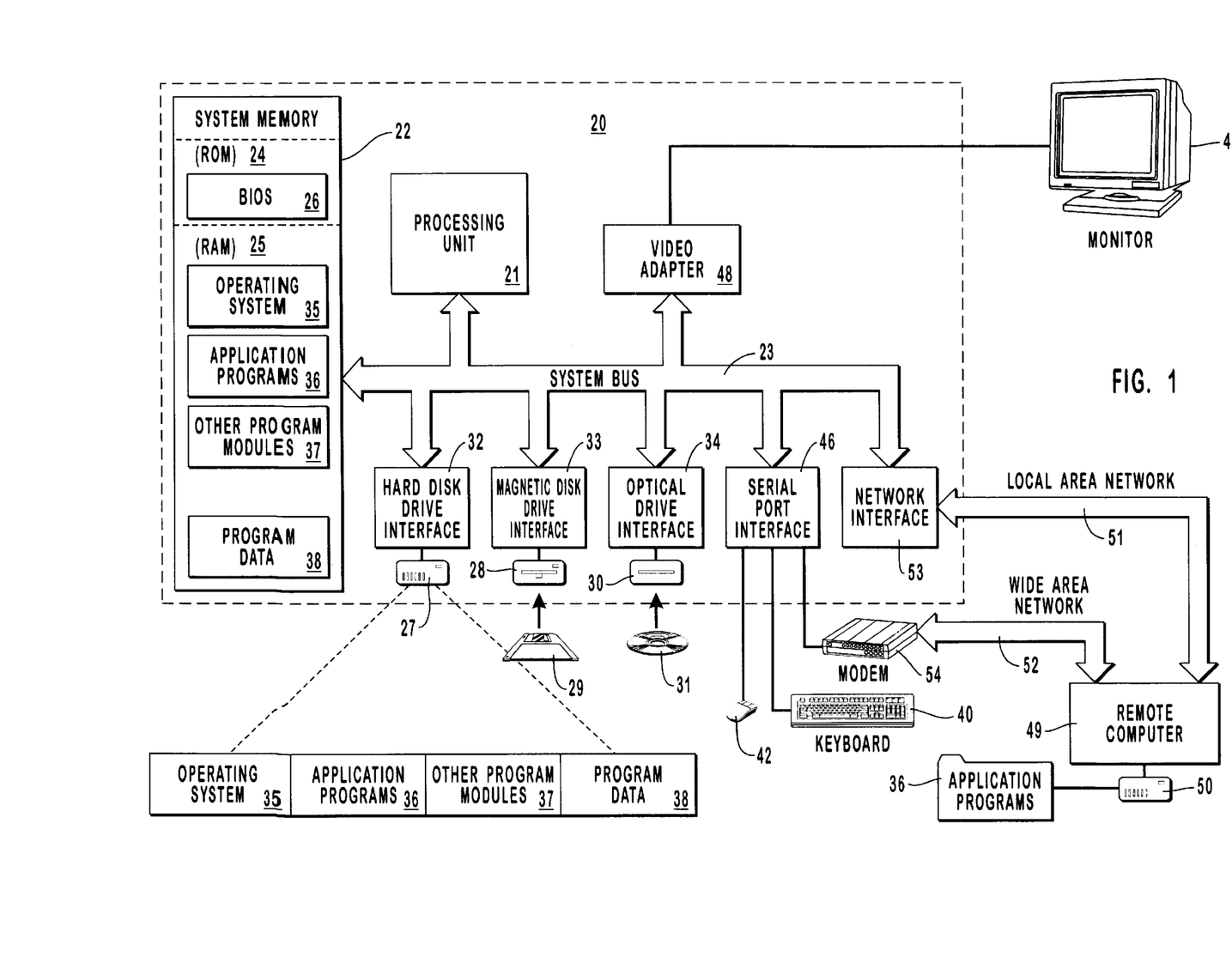
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, may be stored in ROM 24. The personal computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus by a hard disk drive interface 2, a magnetic disk drive-interface 33, and an optical drive interface 34, respectively. The drives and their associated computer-readable media provide nonvolatile storage of computer readable instructions, data structures, program modules and other data for the personal computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a Universal Serial Bus (USB). A monitor 47 or other type of display device is also connected to system bus via an interface, such as video adapter 48. In addition to the monitor, personal computers typically include other peripheral output devices (not shown), such as speakers and printers.

The personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
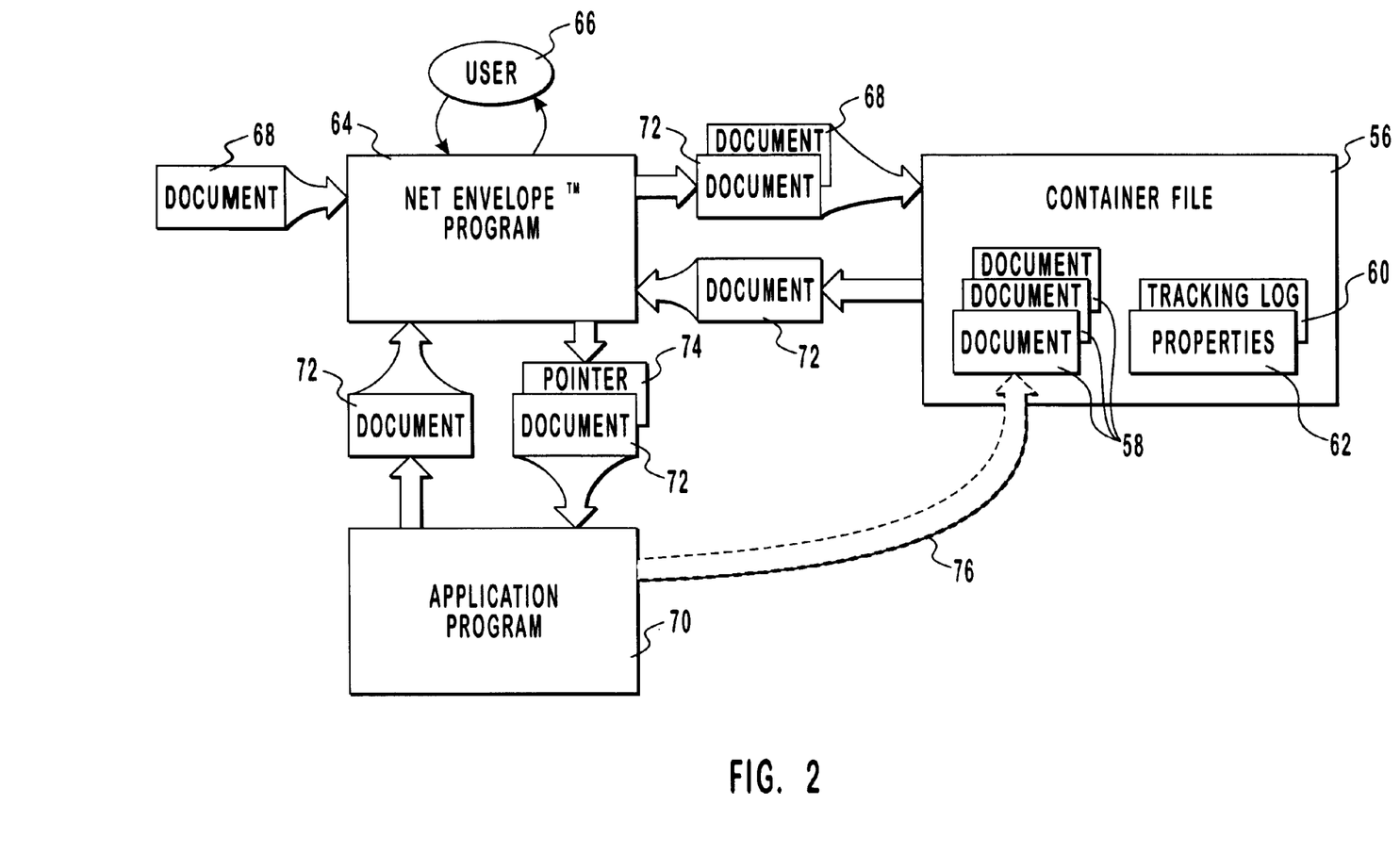
FIG. 2 is a top level diagram illustrating an embodiment of the present invention.

Referring next to FIG. 2, a top-level diagram of the present invention is illustrated. The present invention provides a mechanism to store a plurality of documents and other information into a single file so that the documents may be easily exchanged and used by a group of individuals. In the present invention, documents and other information are stored within a single container file often referred to as a "NetEnvelope" (a trademark of NetVoyage Corp) or more simply an envelope. In FIG. 2 a container file 56 is illustrated by. A container file may store a wide variety of information. For example, a NetEnvelope may be used to store one or more documents that are adapted for use by a specific application program. In FIG. 2, the storage of such documents are illustrated by documents 58. In addition to documents, other information may also be stored in a container file. For example, a container file may store a tracking log, such as tracking log 60. As explained in greater detail below, tracking log 60 may store information that allows actions performed on container 56 and/or documents 58 to be recorded. Tracking log 60 provides a mechanism whereby changes and other actions performed by entities on the envelope may be tracked and identified. This may provide important security features to the envelope, documents, and other information contained therein. By recording what actions were taken by which individuals, authorized actions taken by individuals can be identified. The structure and contents of tracking log 60 are discussed in greater detail below.

In addition to documents and tracking log information, container file 56 may also comprise various other types of information. This information is illustrated in FIG. 2 by properties 62. As explained in greater detail below, properties 62 represent information about documents 58 or container file 56 that is useful or desired. Such information may include, for example, the author of a particular document, summary information regarding a particular document, version information for either the container file or a document, and so forth. The various types of information that may be stored in properties 62 is explained in greater detail below.

User interaction with container file 56 may occur through a program such as NetEnvelope™ program 64. NetEnvelope program 64 implements various user interfaces and functionality to achieve the various goals of the invention. For example, NetEnvelope program 64 is responsible for setting up the structured storage used by container file 56. Other functionality that may be incorporated into NetEnvelope program 64 is the creation and maintenance of tracking log 60, the updating of some or all of properties 62, placement of documents into and retrieval from container file 56, security functions, synchronization functions to keep various copies of a particular container file synchronized, container file transfer functions whereby a container file is transferred or sent to another system or user, and so forth. Certain functionality incorporated into NetEnvelope program 64 is discussed below. The focus of this application, however, is on the structure of container file 56 and the storage of multiple documents and other information in container file 56.

NetEnvelope program 64 may store documents into container file 56 and retrieve documents from container file 56 as follows. If NetEnvelope program 64 is to store a document into container file 56, NetEnvelope program 64 will obtain a document and place the document into the appropriate storage structure of container file 56. Such a document may be obtained from a variety of sources. For example, a user, such as user 66 may identify a document, such as document 68 to be placed in container file 56. NetEnvelope program 64 will then obtain document 68, and place document 68 into the appropriate storage location of container file 56. From a user interface point of view, it may be desirable to allow a user to drag an icon representing a document to a location on the user interface representing the envelope or its contents. Such an action may be a signal to NetEnvelope program 64 to obtain the identified document and place it into the identified container file. Other mechanisms may also be used to allow a user to identify a particular document that should be placed into a container file. In a similar fashion, users may be able to identify documents in the container file that should be removed from the envelope.

As previously explained, container file 56 may store one or more documents adapted for use by application programs, such as application program 70. Application program 70 may then manipulate information in the document and return the document to container file 56. Such a procedure may begin by a user indicating that a document in container file 56 should be manipulated via a particular application program. Such an indication may be given by double clicking on an icon representing a particular document, selecting an icon representing a particular document and opening it, or any other manner appropriate to the particular user interface implemented. NetEnvelope program 64 may then retrieve the desired document, as illustrated in FIG. 2 by document 72. The identified document may then be passed to the appropriate application program. This process is illustrated in FIG. 2 by document 72 being passed to application program 70. Once application program 70 is finished with the document, then the document may be returned to NetEnvelope program 64 which may then return the document to the container file.

Depending on the particular implementation of container file 56 and the particular application program, it may not be necessary to extract a document from the container file in order to allow the application program to access the appropriate document. For example, if a particular application program is adapted to access the particular type of structured storage used to implement a container file, then it may be possible for the application program to retrieve information directly from, and store information directly to, the container file. All that may be necessary is for NetEnvelope program 64 to provide sufficient information to the application program to allow the application program to directly access the document in the container file. In FIG. 2, this is illustrated by NetEnvelope program 64 passing pointer information 74 to application program 70. This information needs to be sufficient to allow application program 70 to access the appropriate document directly, as indicated by dashed arrow 76 in FIG. 2. In either case, it will be necessary for NetEnvelope program 64 to update tracking log 60 as appropriate.

The decision as to whether to allow an application program direct access to a container file will be governed by many factors. These factors may depend upon the particular intended use of a particular embodiment. For example, if all access goes through NetEnvelope program 64, then NetEnvelope program 64 may act as a kind of gatekeeper controlling access to a particular container file. Such an arrangement may allow NetEnvelope program 64 to implement various security measures including tamper seals and/or encryption. In order to eliminate the overhead of accessing information through NetEnvelope program 64, in some embodiments it may be desirable to allow an application program to directly access a document in container file 56, with NetEnvelope program 64 updating security and/or tracking log information as appropriate.

Figure 3:
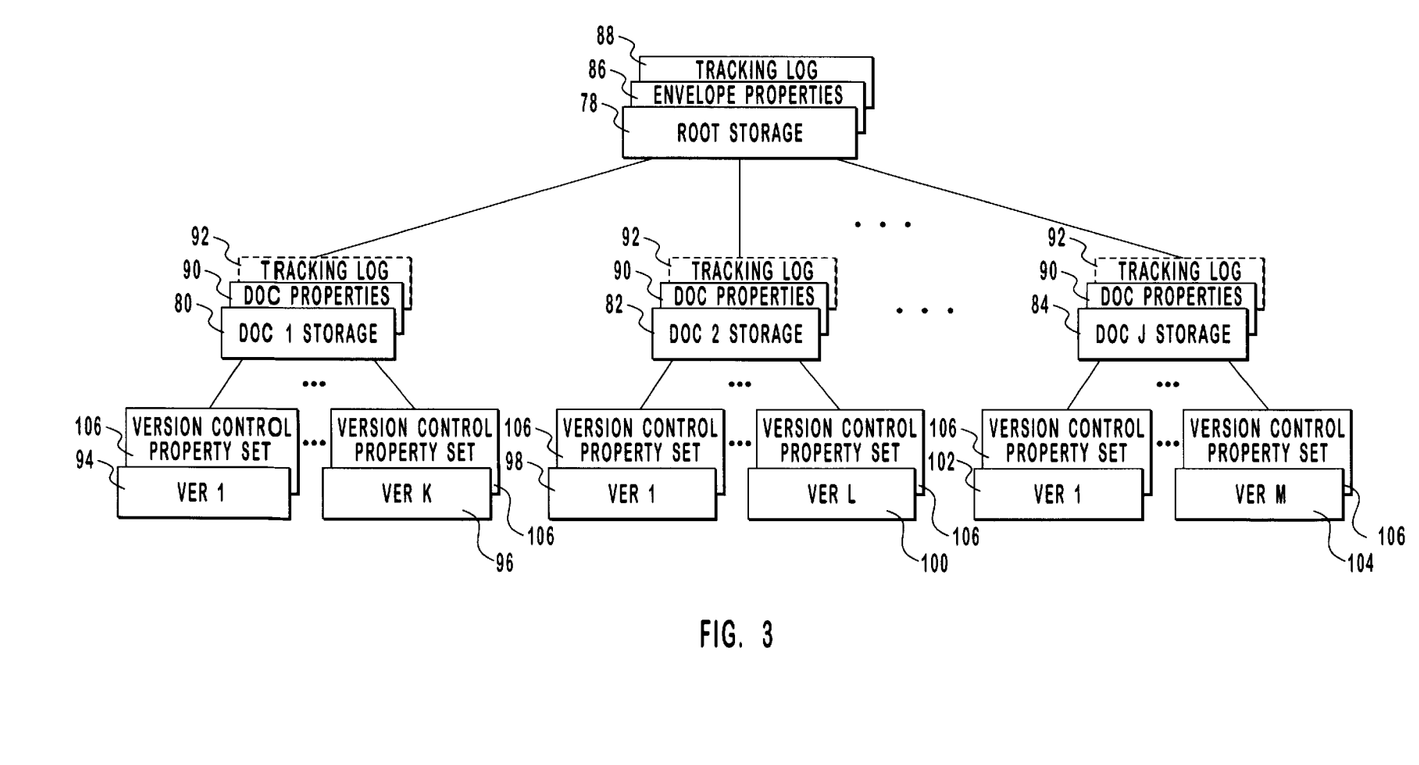
FIG. 3 is a diagram illustrating the structured storage of one embodiment of the present invention.

Referring now to FIG. 3, more detailed information regarding the storage structure of one embodiment of container file 56 is presented. This embodiment is given by way of example and not limitation. Container file 56 may be implemented using a wide variety of structured storage technologies. For example, Microsoft Corporation has established a standard referred to as the OLE compound file standard. This standard, constructed using Microsoft OLE technology, can be used to build structured storage files suitable for a container file. Other structured storage technologies may also be utilized. For example, IBM Corporation and Apple Computer have developed a standard referred to as OpenDoc and a JAVA standard exists called JAVA Beans. In addition, structured storage may be implemented using no particular standard at all, simply utilizing standard programming techniques to construct an appropriate structured storage mechanism. However, since utilizing an appropriate standard will make the resultant file more interoperable with other applications and programs, it may be desirable to utilize an appropriate standard. The discussion which follows will focus on the Microsoft OLE compound file technology. More information regarding the OLE compound file technology may be found in Chapter 7 of *Inside OLE, Second Edition* by Kraig Brockschmidt published by Microsoft Press, 1995, incorporated herein by reference. One of skill in the art will, however, be able to identify how to implement an appropriate structured storage utilizing any appropriate technology.

OLE compound file technology defines two fundamental concepts. The first concept is that of a "storage" which is roughly analogous to a directory on a disk. The second concept is that of a "stream" which is roughly analogous to a file on a disk. Thus, within a single file, a storage may be used to create a structure where streams may be placed to store appropriate information. Referring now to FIG. 3, one embodiment of the present invention begins with a storage structure defined by root storage 78. In a hierarchical relationship to root storage 78 is an individual storage for each of the documents that will be stored in the container file. In FIG. 3, three document storage locations are defined; these are labeled document 1 storage 80, document 2 storage 82, and document J storage 84. As illustrated in FIG. 3, any number of document storages may be created and placed in the container file.

Stored in the various storages are streams containing information placed in the container file. Exactly what information is stored will depend on the particular implementation. In the embodiment illustrated in FIG. 3, root storage 78 is placed in at least one stream containing envelope properties 86 and at least one other stream containing tracking log 88. Throughout this discussion, envelope properties 86 and tracking log 88 will be identified as being stored in a single stream each. However, such reference is made for notational convenience only. Envelope properties 86, as well as tracking log 88, may be stored in more than one stream, depending upon the particular implementation. As explained in greater detail below, envelope properties 86 actually contains three distinct property sets. It may be desirable to store each property set in an individual stream. Envelope properties 86 contain information that is useful or desirable to track independently of the documents or other information stored in the container file. Tracking log 88 is also discussed in greater detail below. In summary, however, tracking log 88 stores a record of the entities that perform various actions on either the envelope, the documents, or both.

Stored at each document storage is document control property set 90. Document control property set 90 contains information relating to the individual documents stored in the storage. Although any useful or desired information may be stored in document control property set 90, in one embodiment document control property set 90 comprises the document name, the default version number, the global ID of the document, the identity of the last user to save the document, the last saved date/time, the documents collision group, is and the document's tamper seal.

The document's name is the user name given to the document and the name by which the document is known to the user. The default version number is the current version of the document that is opened by default. Because multiple versions of each document may be stored, as described below, it may be desirable to store a default version number so that programs know which version to retrieve by default when opening or editing a document. The global ID is a unique identifier given to each document to aid in matching documents in various copies of a container file. A global ID is useful, for example, when trying to synchronize and resolve conflicts between two copies of a container file. The last user to save the document is the identity of the user which last saved the document. The last saved date/time is the time that the save occurred. The document collision group is a property helpful in handling conflicts. For example, if two copies of a document are changed simultaneously by different individuals, a conflict between the versions can exist. In this case, it can be possible to save both versions of the document and allow a user to sort it out. The document can then be identified as a member of a collision group until the conflict is resolved. The tamper seal is information that allows unauthorized access or tampering of the document to be recognized. For example, such a tamper seal may include a check sum or digital fingerprint of the information calculated according to some method which allows tampering of the document to be identified. In one embodiment the MD5 algorithm is used to generate a signature. As explained below, multiple versions of a document may be stored. If multiple versions are stored, a tamper seal for each version may be stored. In the alternative, the tamper seal property may be stored as part of version control property set 106, discussed below.

In addition to document properties 90, FIG. 3 illustrates that each document storage may also have tracking log 92. As explained in greater detail below, tracking log 88 stored at root storage 78 contains information regarding events that have occurred for all documents within the container file. However, storing a single large tracking log at the root storage level is not the only way to record and track events that occur to a container file or to documents within the container file. For example, each entry in a tracking log may include a wide variety of information. Such information may include, for example, the identity of the individual taking the action, the action that occurred, the object of the action, and the time that the action occurred. As explained in greater detail below, other information may also be tracked. Organizing these entries may occur in a wide variety of ways. For example, it may be desirable to organize the event entries by actions. As another example, it may be desirable to organize the event entries by identity of the user taking the action. As yet another example, the event entries may be organized by the target of the action. In such a situation, it may be desirable to maintain individual tracking logs for each of the various documents rather than one global tracking log for all entries. It may also be desirable to maintain some combination of the two. Tracking log 92 is shown in dashed lines to indicate that such a log may be optional, depending upon the particular implementation selected. In addition, it may not be necessary to track global events and thus may not be necessary to maintain tracking log 88, depending on the particular implementation. In general, however, it is believed that it is important to track events that occur to the container file itself. In such an embodiment, it makes sense to store such events in a global tracking log such as tracking log 88.

Stored in each document storage is various versions of the document. These are illustrated in FIG. 2 by versions 94, 96, 98, 100, 102, and 104. As described above, it may be desirable to store complete versions of the document whenever a new version is created. In the alternative, it may also be possible to store a basic version and then store changes to that basic version to arrive at a second version. The actual implementation will depend upon various design factors which are not important to the basic invention. It is, however, generally preferred to store sufficient information to allow the various versions of the document to be obtained. In some embodiments, it may be desirable to simply store one version of the document. Obviously, in these embodiments there would only be one version in each document storage with the older version being discarded when a newer version is created.

Associated with each version of the document is version control properties set 106. Version control properties set 106 may store any information desirable to track for each individual version. In one embodiment, version control property set 106 comprises the creation date and time of the document version. Other information may also be stored in the version control property set 106. For example, it may be desirable to store the version of the application program that created the document version. It may also be desirable to store the tamper seal of the version, as explained above.

The storage structure illustrated in FIG. 2 is given by way of example and not limitation. Other structures may also be used. For example, in one embodiment it may be desirable to collect all of the individual document storages 80, 82, and 84 and organize them under a single global document storage. This will result in each of the individual document storages being a substorage under the global document storage. Similarly, if tracking log 88 comprises a plurality of streams, it may be desirable to store the streams in a tracking log storage that is a substorage of the root storage. Other combinations are also possible.

Figure 4:
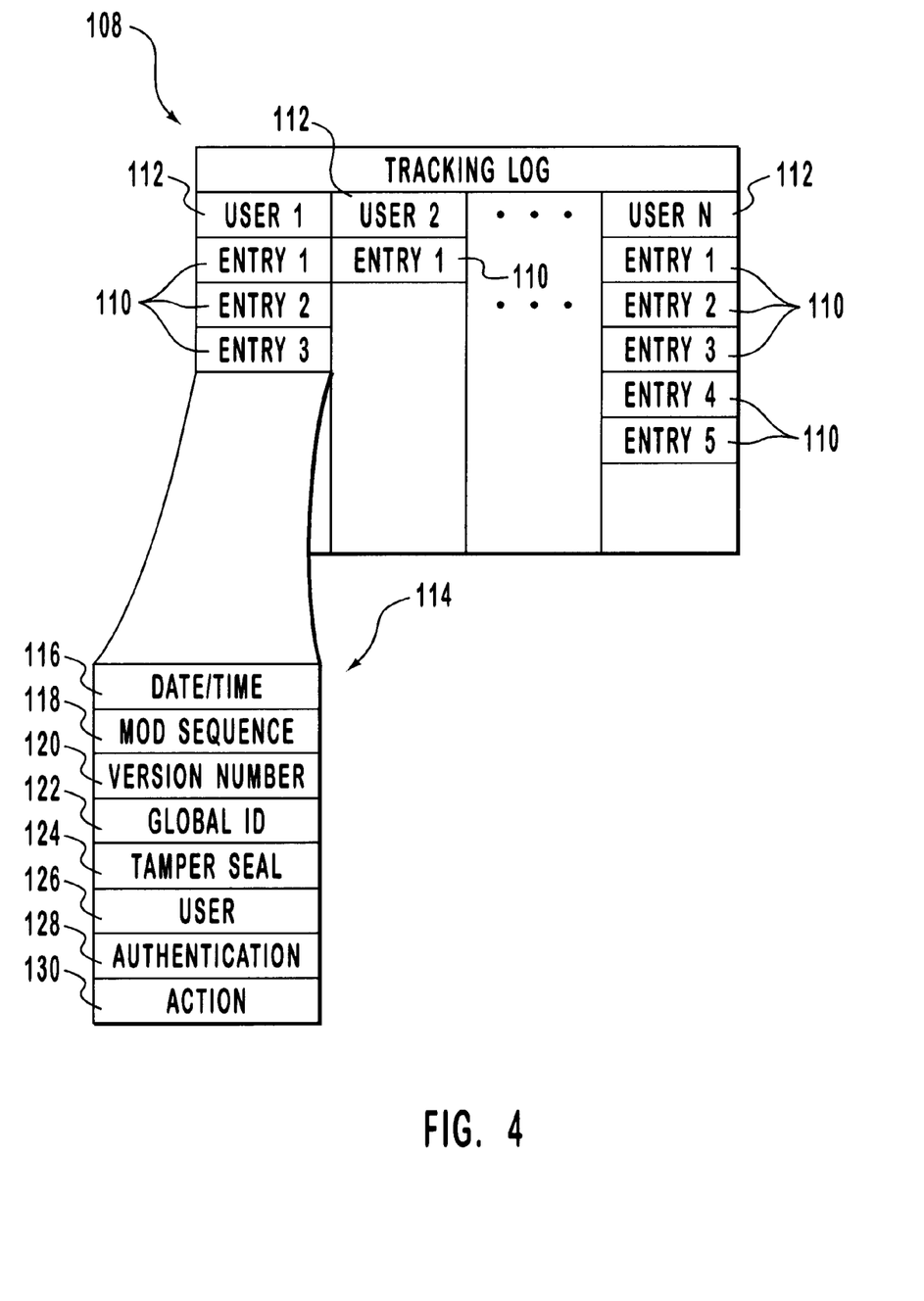
FIG. 4 is a diagram illustrating one embodiment of a tracking log.

Referring next to FIG. 4, more detail regarding one embodiment of tracking log 88 is presented. Tracking log 88 may store a wide variety of information depending upon the particular implementation of the invention. The information stored in a tracking log will largely depend upon what use is to be made of the tracking log. If, for example, the tracking log will be used to perform full auditing of all events that occur with regard to a container file, then a larger amount of information may need to be stored in the tracking log than for an embodiment that wished to track only specified events or only events relating to a particular document or class of documents. The embodiment presented in FIG. 4 represents but one example of many possible embodiments of a tracking log. As such, the example should be considered as exemplary and not as limiting the scope of the invention.

The tracking log in FIG. 4 is shown generally as 108. As illustrated in FIG. 4, the tracking log comprises a plurality of entries 110 organized by individual entities 112. In FIG. 4 the individual entities are labeled User 1, User 2, and User N. Note that in the tracking log it is not necessary to store user 112. User 112 simply represents the logical organization of the tracking log into groups of entries pertaining to the same user. Throughout the description of the invention, reference may be made to a user. The scope of this term should be interpreted broadly to include not only users of computers or computer programs, but any entity that may perform actions that should be logged in tracking log 108. It should be noted that although tracking log 108 has been organized by entities which perform actions, any other desirable organization may be utilized. As explained below, each entry of the tracking log comprises a plurality of data fields wherein particular information is stored. Any field in the entry may be a basis for organizing the tracking log. Thus, a tracking log may be organized, for example by time the action was taken, by the action that was taken, by the target of that action, or in any other manner suitable to a particular implementation. As previously mentioned, when a tracking log is organized in a particular way, it may be stored in a single stream or with multiple streams, each for an individual organizational category. For example, if the log is organized by users as illustrated in FIG. 4, the log may be stored in multiple streams, one for each user or may be stored in a single, larger stream.

In the embodiment illustrated in FIG. 4, an individual entity comprises the plurality of data fields shown generally as 114. As illustrated in FIG. 4, data fields 114 comprise date/time field 116, modification sequence field 118, version number 120, global ID 122, tamper seal 124, user 126, authentication 128, and action 130.

The date/time field 116 is a field where the date and time the action took place is stored. Modification sequence 118 stores the modification sequence number of the envelope when the action was taken. Each envelope has a modification sequence number that is incremented when a change is made either to the envelope or to a document within the envelope. The modification sequence number is used in identifying and resolving conflicts, as explained above. Version number 120 stores the document version number that is the target of the action or a zero if the target of the action was the envelope and not a document. The global 122 ID is the global ID of the document that was the target of the action or zero if a document was not the target of the action. Tamper seal 124 contains tamper seal information for the record. The tamper seal allows detection of the tampering with the tampering log entry. As previously described, any technology capable of generating an entry that can detect tampering of the record may be utilized in this field. In one embodiment the MD5 algorithm, initialized with a secret key, is used to generate tamper seal 124. User 126 is the identity of the user that performed the action. Authentication 128 contains the method used to authenticate user ID 126. Action 130 may be a code and/or plain text representing the particular action taken. Such codes or text may identify such actions as document editing, document viewed, document deleted, document renamed, document imported, document security information changed, envelope copied, envelope created, envelope mailed, document previewed, new document created, and tamper seal violation detected. Essentially action 130 may contain codes or text for any actions that are to be tracked.

Returning for a moment to authentication 128, a further explanation of this field may be useful to fully understand what this field contains and how it is useful. The present invention is designed to allow the exchange of containing files containing documents and other information among a group of individuals. The exchange relies on an email or other transport mechanism to transfer envelopes between users. The transport mechanism typically connects a wide variety of systems. Transport mechanisms may include email, HTTP, or other transport mechanisms using LAN, WAN, wireless, or any other communication technology.

Because an email transport mechanism can connect widely different types of systems, users on those systems may have been authenticated in a wide variety of ways. For example, some systems require a secure authentication procedure where a user supplies a password known only to that user. When such a procedure is utilized, the degree of confidence that a user is actually who he or she purports to be can be quite high. On the other hand, some systems require little or no authentication. Windows 95 provides an opportunity for a user to enter a password. However, such a password challenge can be bypassed and a user allowed to operate the system without supplying a password. In such an environment, there is little or no confidence that a user is who he or she purports to be. Authentication field 128 can thus be an indication of the degree of confidence one can place in the identity of the user contained in user field 126.

Figure 5:
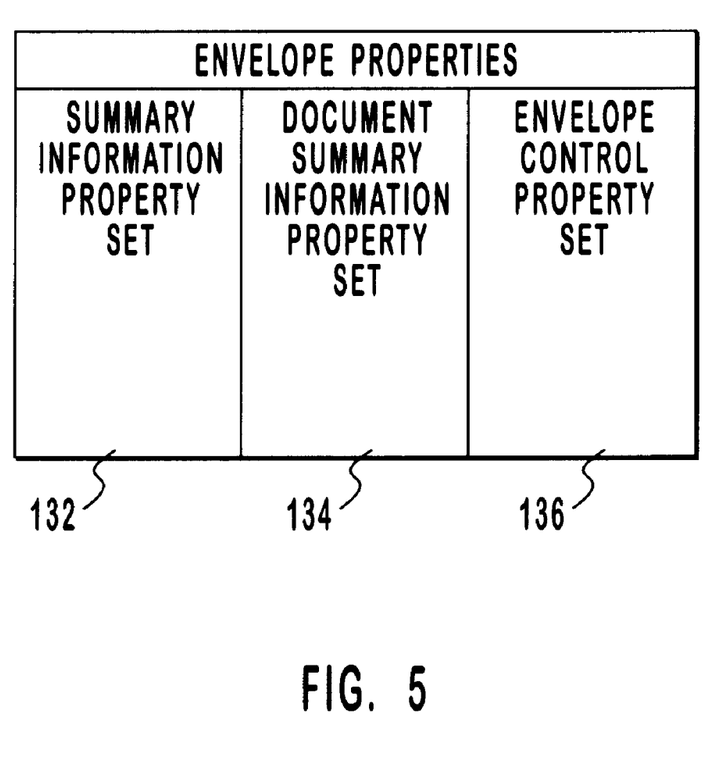
FIG. 5 illustrates properties of one embodiment of the present invention.

Referring now to FIG. 5, an example of one embodiment of envelope properties 86 of FIG. 3 is presented. Such an embodiment is given by way of example, and not limitation. Envelope properties 86 may be used to store any information that is necessary or desirable to maintain about the envelope. As illustrated in FIG. 5, the envelope properties contain three distinct property sets. These property sets comprise summary information property set 132, document summary information property set 134, and envelope control property set 136. Summary information property set 132 is the standard Microsoft summary information property set. Information regarding the summary information property set can be obtained from Chapter 16 of *Inside OLE, Second Edition*, by Kraig Brockschmidt published by Microsoft Press, 1995, incorporated herein by reference. The standard summary information property set includes the title or name of the envelope, the subject of the envelope, the author or creator of the envelope, key words describing the envelope, a template field, a field indicating who was the last individual to save something in the envelope, a revision number, total editing time, a last printed field describing when a document was last printed, a creation date/time field, a last saved date/time field, number of pages, number of words, number of characters, a thumbnail or summary field, the name of the application creating the envelope, and a security field. Note, that not all of these fields may be applicable to all implementations of a container file. Thus, it may be desirable to adapt the standard Microsoft summary information property set to include only that information applicable to the envelope as a whole.

Document summary information property set 134 is the standard Microsoft summary information property set. This property set contains user-defined properties. In this property set, a user may define properties that he or she wishes to track and maintain. These properties may then be stored in this set and retrieved for various purposes. In one embodiment, the user is allowed to dynamically create, modify, and delete properties and information stored in the properties. Additional information is available in the appendix "OLE serialized property set format" of the document "COM and ActiveX object services" in the Microsoft platform software development kit.

Envelope control property set 136 stores various information relating to the envelope status, the location of the master copy of the envelope, the envelope's modification sequence, a list of items which are synchronized or replicated between various copies of the envelope, an indication of when the envelope expires, routing information, mappings of various log information to user names, and return address information displayed to a user in a graphical view of the envelope.

Figure 6:
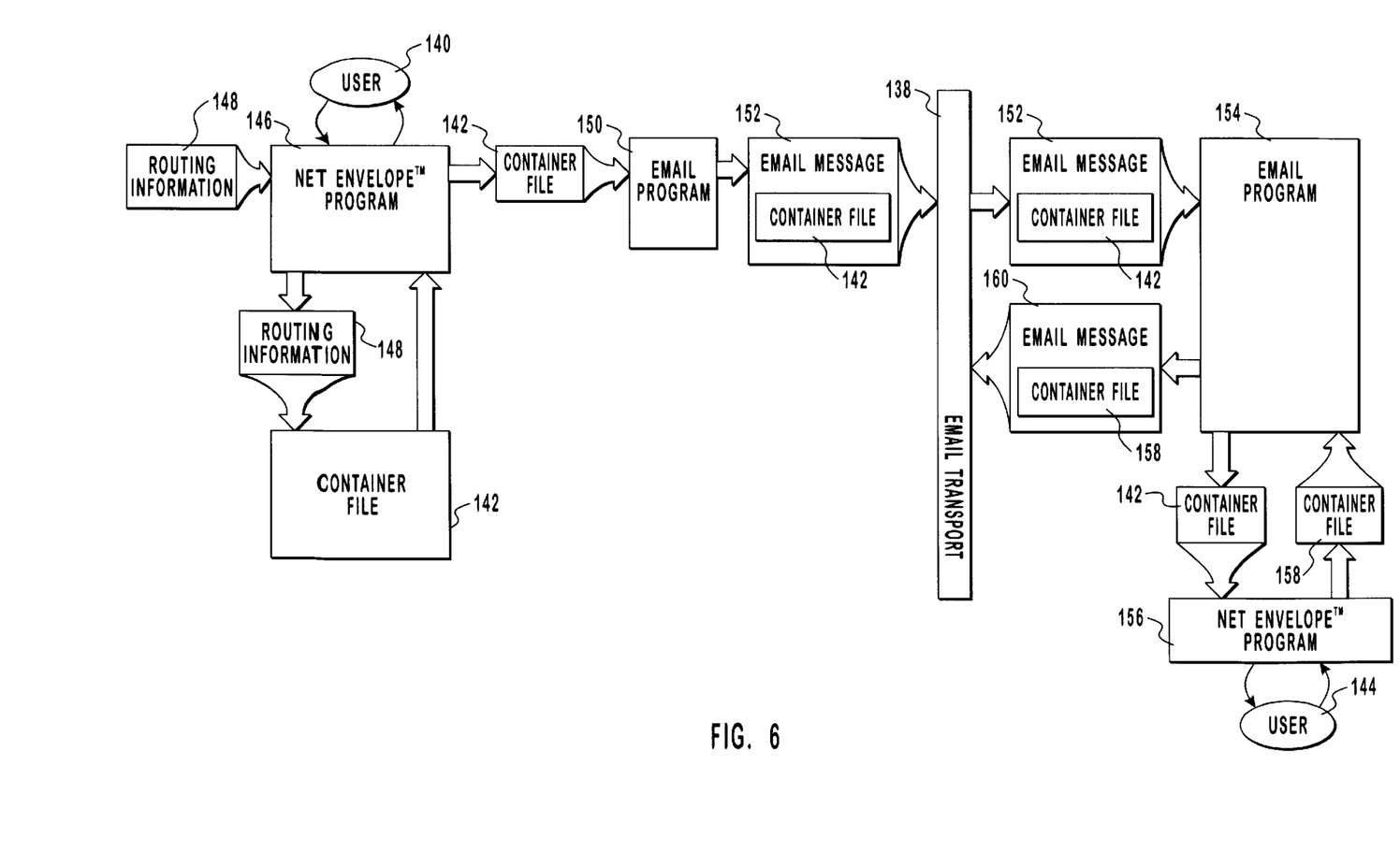
FIG. 6 illustrates the transfer of an envelope file using an email transport.

Referring now to FIG. 6, the process of exchanging and routing envelopes via an email transport is depicted. Although an email transport is illustrated in FIG. 6, as previously established, other types of transport mechanisms may also be used. The embodiment in FIG. 6 is, therefore, given by way of example and not limitation. As previously discussed, one of the primary benefits of the present invention is the ability to exchange and route information among various individuals. The primary mechanism for allowing such routing and exchange of information is an email transport. In FIG. 6 such an email transport is depicted by email transport 138. An email transport is ideally suited for routing and exchange of containing files for a variety of reasons. First, many different types of systems allow reception and processing of email. This is particularly true given the widespread growth and pervasiveness of wide-area networks such as the Internet. In virtually every case, email messages may include attachments in the form of files, documents, and so forth. Thus, it is possible to create a container file and attach it to an email message for transport to another individual. The present invention allows multiple copies of a container file to exist. Mechanisms may then be put in place to synchronize changes made in the various copies so that information in the container files remains consistent from copy to copy. Such synchronization may be accomplished by exchanging information over the same email transport or through a different transport.

Returning again to FIG. 6, suppose that user 140 wished to route container file 142 to various other users including user 144. To accomplish this, user 140 would interact with NetEnvelope™ program 146 and provide to NetEnvelope program 146 routing information 148. Routing information 148 would then be stored within container file 142 by NetEnvelope program 146 as illustrated in FIG. 6. As previously mentioned, such routing information can be stored in the envelope control property set, such as envelope control property set 136 of FIG. 5.

Once the routing information is stored in container file 142, NetEnvelope program 146 will interact with email program 150 and provide container file 142 to email program 150 so that an email message, such as email message 152 can be created with container file 142 as an attachment. The email message is then delivered to the transport which transfers email message 152 to email program 154. Email program 154 can cooperate with NetEnvelope™ program 156 to extract container file 142 from email message 152 and provide container file 142 to NetEnvelope program 156.

At this point container file 142 has been transferred to user 144's machine where user 144 has access to the envelope. User 144 may be notified of the arrival of container file 142 via email program 154 as is typically done by these type of programs. If necessary, user 144 may intervene and aid in the extraction of container file 142 from email message 152.

User 144 may then perform any appropriate actions on container 142. If user 140 had set a route for container file 142 that included other users, NetEnvelope program 156 could identify that container file 142 was in the middle of a route. NetEnvelope program 156 could then change the user interface presented to user 144 to allow user 144 to continue the route after user 144 had finished with container file 142. In this situation, when user 144 indicates that the route should be continued, NetEnvelope program 156 can remove user 144 from the routing information contained in container file 142, select the next user on the route, give the envelope to email program 154 and create a new email message with the container file and deliver it to the email transport. In FIG. 6 this process is illustrated by container file 158, which represents a modified version of container file 142. Email message 160 with attached container file 158 represents the new email message created by email program 154.

It will be apparent from the above example that a routed email message is one which has a defined routing sequence where the email message is passed from one individual to the next individual on the distribution list. Such a scheme is particularly useful in a variety of situations such as when a document is being reviewed by various members of a work group and it is desirable that each member of the work group be able to see the comments of others before making his own comments. In the alternative, a container file may be broadcast to a plurality of users simultaneously using a similar mechanism. Thus, container files may be distributed and shared in a variety of ways utilizing an email or other-transport and various routing or distribution methods.

Any operations that can be performed on a file may be performed on a container file. Such operations may include copying to create multiple copies of a container file. In such a situation, it may be desirable to synchronize the information in the multiple copies of a container file in order to present a consistent view to each user no matter which copy of the container file is utilized. An embodiment of a NetEnvelope™ program that allows synchronization of information among various copies of a file may be utilized for such a synchronization process. It would be particularly useful to implement procedures that allowed the information within the container file to be synchronized at least at the document or version level. Thus, when one individual makes a modification to a version of the document, it is desirable that that modification then be propagated through the network users to all copies of the container file. To accomplish this function, the necessary functionality may be incorporated into NetEnvelope program 146. Since NetEnvelope program 146 bears primary responsibility for maintaining the properties and other information within the container file, it is possible for NetEnvelope program 146 to track changes made to documents in the container file, and transfer a version of the documents containing those changes to other NetEnvelope programs holding copies of the container file. Such a process may require a NetEnvelope program to track where other copies of the container file are located so that proper synchronization information may be transferred to the appropriate location.

In addition to the synchronization of information among copies of container files, it may also be desirable to implement conflict resolution procedures in a NetEnvelope program. Whenever two copies of a container file exist, there is always the possibility that one user will change one copy of the container file and another user change another copy of the container file such that the two copies are incompatible and the conflicts created by the changes need to be resolved. Such conflict resolution procedures may be simple, such as presenting the information to one or more users and allowing them to resolve the conflict, or may be much more complex where the NetEnvelope program automatically resolves conflicts, insofar as possible, without user intervention. The collision group property previously discussed is part of one type of conflict resolution. In this method, conflicting versions of a document are stored within the envelope and the collision group property is set as previously described. Steps may be taken to resolve the conflict such as notifying the owner or other user that a conflict exists and presenting the conflicting information to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for storing a plurality of documents in a single file that can then be accessed by a plurality of entities, the method comprising the steps of:

providing a file structure within the single file, the file structure defining an organization layout for documents stored within the file and including:
    a plurality of document storage locations each adapted to store at least a portion of a document; and
    at least one tracking log location adapted to store a history of actions performed by any of the plurality of entities on either the single file or the document;
  storing at least one document in one of the document storage locations; and
  placing in said tracking log an entry when a predetermined action is performed on the file by any one of the plurality of entities, the entry comprising information regarding said action, the information comprising one or more of access date/time, user identity, method used to authenticate user identity, action that occurred, object of the action, modification sequence, version number, global identification of the document, or tamper seal information.

2. A method for storing a plurality of documents as recited in claim 1 further comprising the step of storing in a document property location defined by the file structure, at least one property of the at least one stored document.

3. A method for storing a plurality of documents as recited in claim 1 further comprising the step of storing in a file property location defined by the file structure, at least one property of the single file.

4. A method for storing a plurality of documents as recited in claim 1 further comprising the step of transferring at least one copy of said single file from one entity to another entity via a communications transport mechanism.

5. A method for storing a plurality of documents as recited in claim 4 further comprising the step of synchronizing the contents of the at least one copy with the contents of the single file, whereby the at least one document in the copy matches that contained in the single file.

6. A method for storing a document and an associated tracking log within a single file, comprising the steps of:
  obtaining at least a portion of a document to be stored in a single file;
  storing said at least a portion of the document in said single file;
  providing a predefined file structure format for organizing the document within the single file, the file structure format including a definition for a tracking log data area adapted to store a history of actions performed by any of a plurality of entities on either the single file or the document; and
  placing in said tracking log data area a log entry when a predetermined action is performed on the document by an entity, wherein the entry contains information regarding the circumstances of said predetermined action.

7. A method for storing a document and an associated tracking log as recited in claim 6 further comprising the step of storing in a file property location defined by the file structure format, at least one property of the single file.

8. A method for storing a document and an associated tracking log as recited in claim 7 further comprising the step of storing in a document property location defined by the file structure format, at least one property of the document.

9. A method for storing a document and an associated tracking log as recited in claim 8 further comprising the step of storing at least a portion of a second document in said single file in accordance with the file structure format.

10. A computer readable medium having stored thereon a data structure comprising:
  a single file, the file having a predefined file structure defining an organization layout for a plurality of documents stored within the file;
  a plurality of document storage locations organized within the file in accordance with the file structure, each storage location containing at least a portion of a document adapted for use by an application program; and
  at least one tracking log storage location organized within the file in accordance with the file structure, the at least one tracking log storage location having at least one entry comprising information regarding an action performed on the data structure, the tracking log storage location adapted to store a history of actions performed by any of a plurality of entities on either the single file or the documents.

11. A computer readable medium as recited in claim 10 wherein said at least one entry comprises an identity of an entity that performed said action.

12. A computer readable medium as recited in claim 11 wherein said at least one entry comprises an authentication field containing information identifying a method of authenticating said identity.

13. A computer readable medium as recited in claim 10 wherein said at least one entry comprises information identifying at least one operation performed on one of the plurality of documents.

14. A computer readable medium as recited in claim 10 wherein said at least one entry comprises information identifying at least one operation performed on said data structure.

15. A computer readable medium as recited in claim 10 wherein said at least one entry comprises a tamper seal.

16. A computer readable medium as recited in claim 10 wherein at least one of the documents is adapted for use by a first type of application program, and at least one of the documents is adapted for use by a second type of application program.

17. A computer readable medium as recited in claim 10 further comprising at least one property storage location organized within the file in accordance with the file structure, the at least one property storage location containing at least one property of at least one of the documents.

18. A computer readable medium as recited in claim 10 further comprising at least one property storage location organized within the file in accordance with the file structure, the at least one property storage location containing at least one property of said data structure.

19. A computer readable medium having stored thereon a data structure comprising:
  a single file, the file having a predefined file structure defining an organization layout for storage areas within the single file;
  a first storage area stored in a first region of a range of memory addresses in the single file, said first storage area containing at least a portion of a first document adapted for use by an application program;
  a second storage area stored in a second region of said range of memory addresses, said second storage area containing a tracking log having at least one entry comprising information regarding an action performed on said data structure, the tracking log adapted to store a history of actions performed by any of a plurality of entities on either the single file or the documents;
  a third storage area stored in a third region of said range of memory addresses, said third storage area containing at least one property of the first document; and a fourth storage area stored in a fourth region of said range of memory addresses, said fourth storage area containing at least one property of the data structure.

20. A computer readable medium as recited in claim 19 wherein said at least one entry comprises:

an identity of the entity that performed the action on the data structure;

information identifying a method used for authenticating the identity;

information identifying when the action on the data structure was performed; and information identifying what action on the data structure was performed.

21. A computer-readable medium having computer-executable instructions for performing the steps comprising:

creating a single file structure within a single file container, the file structure defining an organization layout for at least one document storage location and at least one file information location;

storing a document in the document storage location;

providing a predefined program interface for allowing access to the document via an application program, wherein the application program is thereby capable of modifying the contents of the document; and in the event that an application program accesses the document, updating the file information location with data signifying at least one detail regarding the access, the data signifying at least one detail comprising one or more of access date/time, user identity, method used to authenticate user identity, action that occurred, object of the action, modification sequence, version number, global identification of the document, or tamper seal information.

22. A method for exchanging a plurality of documents between a plurality of users, the method comprising:

(a) creating a single file structure within a single file container, the file structure defining an organization layout for a plurality of document storage locations, and at least one file information location;

(b) storing at least one document in one of the document storage locations;

(c) storing routing information within the single file structure, the routing information signifying a predetermined set of users that are to receive the file container;

(d) forwarding the file container to one of the users in accordance with the routing information via a transport mechanism;

(e) allowing the receiving user to access the at least one document with an application program;

(f) updating the file information location with data signifying at least one detail regarding the access, the data signifying at least one detail comprising one or more of access date/time, user identity, method used to authenticate user identity, action that occurred, object of the action, modification sequence, version number, global identification of the document, or tamper seal information; and (g) repeating steps (d)–(f) until all of the users in the predetermined set of users have received the file container.

* * * * *

UNITED STATES PATENT AND TRADEMARK OFFICE
CERTIFICATE OF CORRECTION

PATENT NO.   : 6,182,080 B1
DATED        : January 30, 2001
INVENTOR(S)  : Bradley H. Clements It is certified that error appears in the above-identified patent and that said Letters Patent is hereby corrected as shown below:

Column 1,
Line 57, after "view is" delete [it]

Column 3,
Line 7, after "of" change "Net Voyage" to -- NetVoyage --

Column 4,
Line 28, change "document;" to -- document, --

Column 5,
Line 3, change "When formation" to -- Information --
Line 23, after "will" change "be" to -- become --

Column 6,
Line 41, after "system bus" insert -- 23 --
Line 59, after "interface" change "2" to -- 32 --

Column 7,
Line 61, change "Corp)" to -- Corp.) --
Line 62, after "FIG." change "2" to -- 3 --
Line 63, after "trated" delete [by]
Line 64, change "NetEnvelope" to -- container file --

Column 8,
Line 5, after "container" insert -- file --

Column 10,
Line 62, after "group," delete [is]

Column 11,
Line 1, change "below,." to -- below, --
Line 63, after "FIG." change "2" to -- 3 --

UNITED STATES PATENT AND TRADEMARK OFFICE
CERTIFICATE OF CORRECTION

PATENT NO. : 6,182,080 B1
DATED : January 30, 2001
INVENTOR(S) : Bradley H. Clements It is certified that error appears in the above-identified patent and that said Letters Patent is hereby corrected as shown below:

Column 12,
Line 21, after "FIG." change "2" to -- 3 --

Column 13,
Lines 25-26, change "global 122 ID" to -- global ID 122 --
Line 49, after "of" change "containing" to -- container --

Column 15,
Line 2, after "of" change "containing" to -- container --

Signed and Sealed this

Twenty-sixth Day of February, 2002

Attest:

JAMES E. ROGAN
Attesting Officer — Director of the United States Patent and Trademark Office